INVENTOR.
Clark H. Emmons
BY
ATTORNEY

United States Patent Office 3,005,141
Patented Oct. 17, 1961

3,005,141
BATTERY CHARGER
Clark H. Emmons, Pennsauken, N.J., assignor to Radio
Corporation of America, a corporation of Delaware
Filed Nov. 30, 1959, Ser. No. 856,117
5 Claims. (Cl. 320—2)

This invention relates generally to battery chargers, and more particularly to a battery charger adapted to charge secondary batteries from conventional sources of electrical energy usually available in the home or in an automobile. The battery charger of the present invention is particularly useful for charging the relatively low voltage, rechargeable batteries used in portable, transistorized radios.

With the advent of portable, transistorized radios, the amount of electrical energy required to operate these radios has been materially reduced. Small, portable, transistorized radios of good quality can be powered by three or four, small, single-cell batteries. These batteries may be rechargeable cells, such, for example, as secondary cells of the nickel-cadmium type. Because of the relatively low voltage of the batteries required to operate a transistorized radio, the conventional source of electrical energy available in a modern automobile is suitable to operate a battery charger for charging these batteries.

Since the positive terminal of an automobile battery is grounded in some automobiles and the negative terminal of the automobile battery is grounded in other automobiles, a battery charger adapted to receive its electrical energy from an automobile battery or generator should have means to provide the radio batteries to be charged with the correct polarity, in order to prevent damage to the batteries and any transistors in the radio that may be electrically connected to them.

It is an object of the present invention to provide a battery charger that is adapted to receive its electrical energy from conventional sources of electrical energy usually available either in the home or in an automobile.

It is another object of the present invention to provide a battery charger that is adapted to prevent damage to the battery to be charged, and to any transistors that may be connected thereto, when the charger is energized from a unidirectional source of voltage whose polarity is opposite to that required by the charger.

A further object of the present invention is to provide a battery charger having a unidirectional, current conducing circuit that performs the dual functions of a rectifier when the charger is energized from an alternating current source of energy, and of a protective circuit for preventing the application of a charge of improper polarity to a battery when the charger is supplied from a direct current source of energy.

Still a further object of the present invention is to provide a battery charger in two separable parts one of which, small and light in weight, can be plugged into the cigarette lighter socket in an automobile when it is desired to charge a battery from a source of supply in the automobile, and the other of which, larger and more bulky than the first, is used together with the first mentioned part when the battery is to be charged from a conventional alternating current source, such as is available in most homes. Since the two parts are easily separable, the larger part can be dispensed with, or left at home, for example, when the battery is to be charged in an automobile.

Another object of the present invention is to provide a battery charger that is relatively simple in construction, easy and convenient to operate from conventional sources of electrical energy, and highly efficient in use.

In accordance with the present invention, the novel battery charger comprises two electrically and physically interconnectable, quick-detachable parts, viz., a transformer unit and a rectifying unit. The transformer unit comprises a housing for a circuit including a transformer and a socket of the type used to receive a conventional, automobile cigarette lighter. The function of this part is to transform a conventional source of A.-C. (alternating current) voltage to a relatively lower A.-C. voltage at the socket. The rectifying unit comprises a plug adapted to be releasably engaged in the socket of the transformer unit. The plug comprises a casing of electrically insulating material having a rectifying circuit therein. A pair of input contacts to the rectifying circuit extend through the forward end of the plug for making electrical contacts with the socket when the plug is engaged in the socket. The output means of the rectifying circuit comprises a cable that extends through an opening in the rear of the casing for supplying energy to the battery to be charged. When a battery is to be charged from a source of A.-C. voltage, the two parts of the charger are electrically and physically interconnected. When a battery is to be charged from the source of electrical energy available at the socket of an automobile cigarette lighter, the rectifying unit, that is, the plug, is inserted directly into the cigarette lighter socket in the automobile, and the transformer unit is not used. A unidirectional device, that is, a diode, in the rectifying unit serves either as a rectifier when the battery is being energized from a source of A.-C. voltage, or as a protective device insuring the proper polarity of the charging voltage applied to the battery when the charger is being energized from the D.-C. (direct current) voltage source of an automobile.

The novel features of the present invention both as to its organization and methods of operation, as well as additional objects and advantages thereof, will be understood more readily from the following description, when read in connection with the accompanying drawing in which similar reference characters designate similar parts, and in which.

Figure 1:
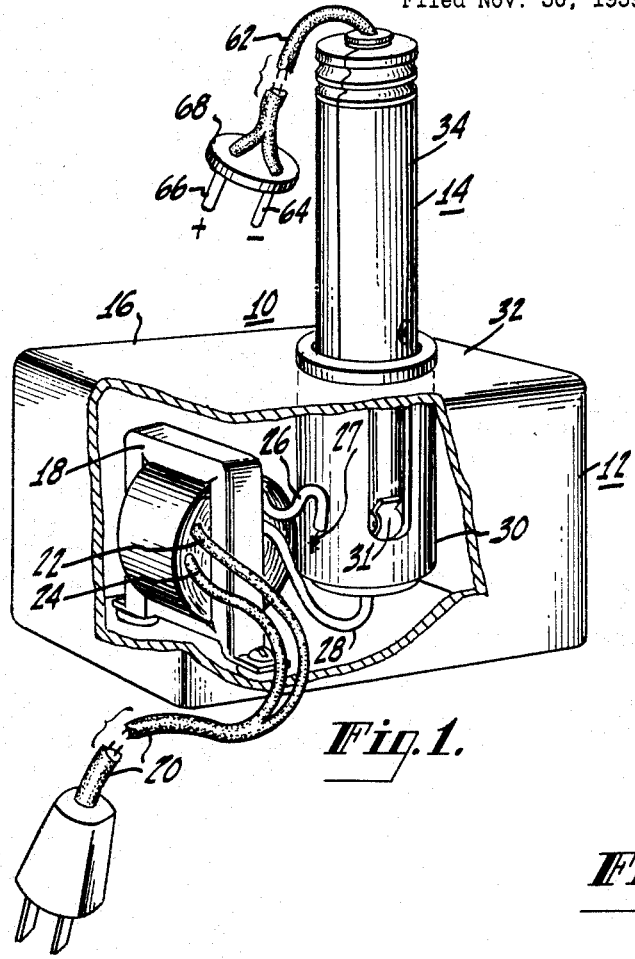
FIG. 1 is a perspective view of one form of battery charger according to the present invention, the transformer unit being shown interconnected with the rectifying unit, and parts of the transformer unit housing being broken away to show the internal components.

Referring, now, to FIG. 1 of the drawing, the novel battery charger 10 of the present invention is shown as comprising two major parts, viz., a relatively large and somewhat bulky transformer unit 12 and a relatively small, compact, light weight rectifying unit 14. The transformer unit 12 comprises a box-like housing 16 that may be made of any suitable insulating material, such as a plastic material. Mounted within the housing 16, by any suitable means, is a step-down transformer 18. A conventional, two-wire, electric cord and plug 20 are connected to the ends 22 and 24 of the primary winding of the transformer 18 to provide input means to the electrical circuit within the housing 16. The ends 26 and 28 of the secondary winding of the transformer 18 are connected to two, separate contacts 27 and 29 (FIG. 3), respectively, of a socket 30 of the type used in automobiles to be releasbly received and be engaged by an electrically operated cigarette lighter of conventional design. The socket 30 is mounted in the upper wall 32 of the housing 16, and it provides output means for the electrical circuit within the housing 16. It will now be understood that an A.-C. voltage applied between the ends 22 and 24 of the primary winding of the transformer 18 will be transformed by the transformer 18 and will appear as an A.-C. voltage of lower amplitude across the two electrical contacts 27 and 29 of the socket 30.

The rectifying unit 14 of the charger 10 is electrically and physically releasably engageable in the socket 30 in the same manner as a conventional automobile cigarette lighter is releasably engageable within a similar socket in an automobile. One or more springs 31 fixed within the socket 30 help to retain the rectifying unit 14 within the socket 30 when the rectifying unit 14 is inserted therein. The rectifying unit 14 comprises an elongated, substantially cylindrical plug formed by a casing 34. The casing 34 is made of two substantially longitudinally, symmetrical parts that are held together by a transversely disposed screw 36 and a nut 38.

Figure 2:
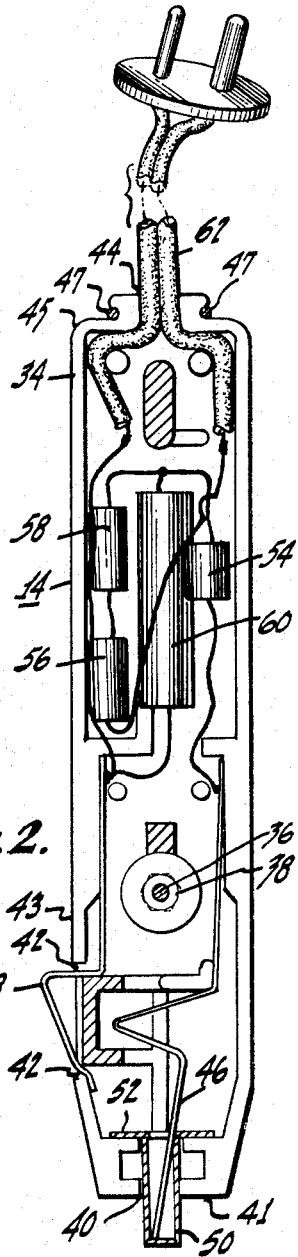
FIG. 2 is a longitudinal cross-sectional view of the rectifying unit of the charger showing one-half of the casing and the internal components and connections therein.

Referring, now, to FIG. 2, there is shown one-half of the casing 34 and the electrical circuit within. The casing 34 of the rectifying unit 14 is formed with three small openings, a small opening 40 at the front end 41 of the plug beyond a taper 35, a rectangular opening 42 in the cylindrical wall 43 adjacent the taper 35 of the plug, and an opening 44 at the rear end 45 of the plug. A C-ring 47 may be seated in an annular groove in the rear end 45 of the plug, if necessary, to prevent the two halves of the casing 34 from spreading.

A pair of spring contacts 46 and 48, within the casing 34, are adapted to extend through the openings 40 and 42, respectively. A cup-shaped contact 50 having an annular rear flange 52 extends through the opening 40 and is urged outwardly by the spring contact 46 which extends within the cup-shaped contact 50.

The circuit within the rectifying unit 14 comprises a diode 54, a pair of resistors 56 and 58, and a capacitor 60. Output means for the electrical circuit within the casing 34 are brought out through the opening 44 in the plug by means of a two-wire cable 62. A pair of output terminals 64 and 66 on a plug 68 are connected to the two wires of the cable 62, each output terminal being preferably of a different transverse diameter for the purpose hereinafter appearing.

Figure 3:
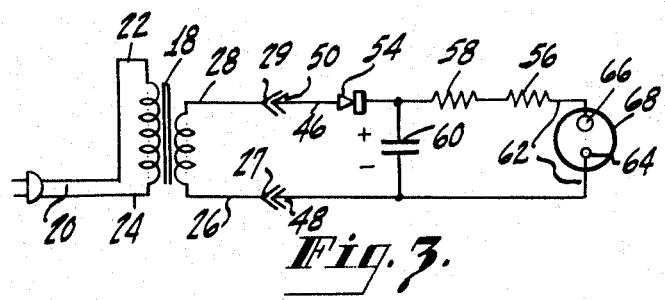
FIG. 3 is a schematic diagram of the battery charger, including both the transformer unit and the rectifying unit.

The electrical components of the circuits within the transformer and rectifying units 12 and 14 are shown diagrammatically in FIG. 3, the same reference characters being used for the schematic symbols as were used for the physical components. When the plug comprising the rectifying unit 14 is inserted within the socket 30, the contacts 50 and 48 are electrically engaged with the two electrical contacts 29 and 27 of the socket 30. The input terminal 50 is connected to the output terminal 66 through a series circuit comprising the diode 54 and the resistors 56 and 58. The input terminal 48 is connected to the output terminal 64. The capacitor 60 is connected between the cathode of the diode 54 and the output terminal 64. The rectifying circuit within the casing 34 may be considered a unidirectional, current conducting circuit as well as a rectifying circuit because the diode 54 is poled in a direction to cause the output terminals 66 and 64 always to be positive and negative, respectively.

In operation, the transformer unit 12 is electrically and physically interconnected with the rectifying unit 14 when it is desired to charge a battery from a source of conventional A.-C. voltage. The plug on the cable 20 is connected to the source of A.-C. voltage, such as the 110-volt A.-C. source found in many homes. The plug 68 is plugged into a circuit (not shown) so that the terminals 66 and 64 connect with the positive and negative terminals of the battery, or batteries (not shown), to be charged. The 110-volt A.-C. input is transformed by the transformer 18 to a suitable voltage, depending upon the voltage of the battery, or batteries, to be charged. The diode 54 of the rectifying unit 14 rectifies the transformed A.-C. voltage to a D.-C. voltage. The capacitor 60 serves to filter the rectified voltage, and the resistors 56 and 58 limit the charging current to a desired amount. Thus, for example, the 110-volt A.-C. source may be transformed to a 28.5 A.-C. voltage in the transformer unit 12, and the transformed A.-C. voltage may be rectified, filtered, and limited to a 6-volt D.-C., 40 milliampere output at the plug 68. These results may be accomplished, for example, when the values of the components are:

Resistor 56_____ 82 ohms, ½ watt.
Resistor 58_____ Do.
Capacitor 60_____ 100 mfd., 25 volt electrolytic.
Diode 54_____ 250 ma. silicon rectifier.

When it is desired to charge a battery from the source of electrical energy available in a modern automobile, such as one having a 12-volt D.-C. electrical system, the rectifying unit 14 is removed from the socket 30 and is inserted directly into the socket in the automobile that normally holds the electrically operated cigarette lighter, and the plug 68 is connected to the batteries to be charged. With a 12-volt D.-C. input at the terminals 48 and 50, and with a charging unit 14 having the value of the components given above, there is provided a substantially 6-volt D.-C., 40 milliampere output. It is noted that the relatively heavy, bulky transformer unit 12 is not used when it is desired to charge batteries from the conventional source of electrical energy available in an automobile. While in the latter case the diode 54 does not function as a rectifier, it serves the important function of insuring that the polarity applied to the batteries to be charged will be correct, thereby preventing an improper voltage from being applied to the batteries. Since the output terminals 64 and 66 are of different transverse cross-sections, they may be made to plug into a suitably formed female socket (not shown). It is noted that, when the anode of the diode is connected to the positive side of an automobile battery (not shown) via the contact 50, a charging voltage of proper polarity will be applied across the batteries to be charged. If, on the other hand, the battery voltage in the automobile is reversed, and the contact 50 makes contact with the negative terminal of the battery, the diode 54 will be non-conductive and will function as an open switch, thereby preventing a voltage of wrong polarity from being applied to the batteries to be charged. Since transistor circuits may be connected to the batteries undergoing the charge, as when the plug 68 is connected to a charging circuit (not shown) in a radio housing the batteries to be charged, the diode 54 will prevent any possible damage to the transistors that may result from the application thereto of a voltage of improper polarity.

From the foregoing description, it will be apparent that there has been provided an improved battery charger that is adapted to charge relatively low-voltage, secondary cells from sources of conventional, electrical energy found either in the home or in modern automobiles. While values of the components have been given for one illustrative case, it will be understood that these values are merely illustrative. It is desired, therefore, that the foregoing description of the invention shall be considered merely as illustrative and not in a limiting sense.

What is claimed is:

1. A battery charger adapted for use either in the home or in an automobile having a socket for receiving an electric cigarette lighter, said charger comprising two releasably engageable parts, one of said parts comprising a first circuit, said first circuit having input means engageable with a source of alternating current and output means comprising a socket similar to said first-mentioned socket and adapted to releasably engage the other of said parts, said other of said parts comprising a casing of electrically insulating material, and a rectifying circuit in said casing, said rectifying circuit having input means and output means, said input means of said rectifying circuit extending through said casing and being engageable with said output means of said first circuit when said parts are engaged, and said output means comprising a cable extending outwardly from said casing and adapted to be connected to a battery to be charged.

2. A battery charger adapted for use either in the home or in an automobile having a source of electrical energy and a socket for receiving an electrically operated cigarette lighter energizable from said source, said charger comprising two releasably engageable parts, one of said parts comprising a first circuit, said first circuit having input means engageable with a source of alternating current and output means comprising a socket similar to said first-mentioned socket and adapted to releasably engage the other of said parts, said other of said parts comprising a plug having a casing of electrically insulating material, and a rectifying circuit in said casing, said rectifying circuit having input means and output means, said input means of said rectifying circuit extending through said casing and being engageable with said output means of said first circuit when said parts are engaged, and said output means comprising a cable extending outwardly from said casing and being adapted to be connected to a battery to be charged, said plug being being adapted to be plugged into said first-mentioned socket to energize said rectifying circuit from said first named source.

3. A battery charger comprising two electrically and physically interconnectable parts, one of said parts comprising an electrical circuit including a socket and a transformer having a primary winding and a secondary winding, means to connect said primary winding to a source of alternating current, said socket having two electrical contacts, means to connect said secondary winding between said two contacts, the other of said two parts comprising a plug releasably engageable in said socket, input means including a pair of input contacts extending from said plug and adapted to make contact with said two contacts of said socket, respectively, an electrical circuit in said plug connected to said input contacts of said plug, and output means including a cable connected to said last-mentioned circuit and extending from said plug.

4. A battery charger comprising two electrically and physically interconnectable, quick-detachable parts, one of said parts comprising a housing, an electrical circuit in said housing including a socket and a transformer having a primary winding and a secondary winding, means to connect said primary winding to a source of alternating current, said socket having two electrical contacts, means to connect said secondary winding between said two contacts, the other of said two parts comprising a plug releasably engageable in said socket, input means including a pair of input contacts extending from said plug and adapted to make contact with said two contacts of said socket, respectively, a unidirectional current conducting circuit within said plug and connected to said input contacts of said plug, and output means including a cable connected to said last-mentioned circuit and extending from said plug.

5. A battery charger adapted to be energized from the electrical energy supplied to a socket engageable by an electric cigarette lighter in an automobile, said charger comprising a plug having a casing of insulating material adapted to be releasably engaged in said socket, and a unidirectional current conducting circuit within said casing, said circuit having a pair of input terminals extending from said casing and electrically engageable with said socket when said plug is inserted therein, said circuit having a pair of output means extending from said casing for connecting to a battery to be charged, said circuit also including a diode and a capacitor, means connecting said diode between one of said pairs of input terminals and one of said pair of output means, means connecting the other of said pair of input terminals to the other of said pair of output means, and means connecting said capacitor between said diode and said other of said pair of output means.

References Cited in the file of this patent
UNITED STATES PATENTS

| | | |
|---|---|---|
| 2,770,765 | Negus | Nov. 13, 1956 |
| 2,867,039 | Zack | Jan. 6, 1959 |
| 2,869,064 | Portail | Jan. 13, 1959 |